US012731403B2

(12) United States Patent
Nabeto et al.

(10) Patent No.: US 12,731,403 B2
(45) Date of Patent: Sep. 8, 2026

(54) PROCESSING APPARATUS, PROCESSING METHOD, AND NON-TRANSITORY STORAGE MEDIUM FOR DETERMINING AN OBJECT BASED ON COLLATED KEYPOINTS AND THRESHOLD VALUE

(71) Applicant: NEC Corporation, Tokyo (JP)

(72) Inventors: Yu Nabeto, Tokyo (JP); Soma Shiraishi, Tokyo (JP); Takami Sato, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 626 days.

(21) Appl. No.: 17/928,215

(22) PCT Filed: May 29, 2020

(86) PCT No.: PCT/JP2020/021379

§ 371 (c)(1),
(2) Date: Nov. 28, 2022

(87) PCT Pub. No.: WO2021/240795

PCT Pub. Date: Dec. 2, 2021

(65) Prior Publication Data

US 2023/0222802 A1 Jul. 13, 2023

(51) Int. Cl.

*G06V 20/52* (2022.01)
*G06T 7/136* (2017.01)
*G06V 20/40* (2022.01)

(52) U.S. Cl.

CPC .............. *G06V 20/52* (2022.01); *G06T 7/136* (2017.01); *G06V 20/44* (2022.01); *G06T 2207/30232* (2013.01); *G06V 2201/07* (2022.01)

(58) Field of Classification Search

CPC .... G06V 20/52; G06V 20/44; G06V 2201/07; G06V 10/98; G06V 10/255; G06T 7/136; G06T 2207/30232

See application file for complete search history.

(56) References Cited

U.S. PATENT DOCUMENTS

2013/0057692 A1 3/2013 Naito et al.
2018/0204054 A1 7/2018 Takeno
2019/0236531 A1* 8/2019 Adato ................. G08B 21/182

FOREIGN PATENT DOCUMENTS

CN 103556561 A * 2/2014
JP 2007140823 A * 6/2007

(Continued)

OTHER PUBLICATIONS

International Search Report for PCT Application No. PCT/JP2020/021379, mailed on Aug. 11, 2020.

(Continued)

*Primary Examiner* — Vincent Rudolph
(74) *Attorney, Agent, or Firm* — Sughrue Mion, PLLC

(57) ABSTRACT

The present invention provides a processing apparatus (10) including: an object region detection unit (11) that detects, from an image, an object region being a region including an object; a reliability computation unit (12) that computes, for each product, reliability in which each of the products is included in an image of the object region; an image parameter computation unit (13) that computes an image parameter related to an image of the object region; a threshold value setting unit (14) that sets a threshold value of the reliability, based on the image parameter; and a product determination unit (15) that determines, based on the reliability of each of the products and the threshold value, the product included in an image of the object region.

7 Claims, 11 Drawing Sheets

(56) References Cited

FOREIGN PATENT DOCUMENTS

| | | | | |
|---|---|---|---|---|
| JP | 2007165947 | A | * | 6/2007 |
| JP | 2011-233060 | A | | 11/2011 |
| JP | 2013-054666 | A | | 3/2013 |
| JP | 2018-116371 | A | | 7/2018 |
| JP | 2018-124798 | A | | 8/2018 |
| JP | 2019079338 | A | * | 5/2019 |
| SG | 10201809740 | | * | 6/2019 |

OTHER PUBLICATIONS

Takuya Miyata, "Structure of Amazon Go Supermarket without Cash Register to be Achieved by 'Camera and Microphone'", [online], Dec. 10, 2016, [search on Dec. 6, 2019], the Internet <URL:https//www.huffingtonpost.jp/tak-miyata/amazon-go_b_13521384.html>.

"NEC, Opened Cash Registerless Store 'NEC Smart Store' in Main Office—Utilization of Face Recognition, Settlement Simultaneously when Leaving Store", [online]. Feb. 28, 2020, [search on Mar. 27, 2020], the Internet <URL:https://japan.cnet.com/article/35150024/>.

Kikuchi et al., "Heterogeneous Object Recognition to Identify Retail Products", NEC technical report, vol. 72, No. 1, 2019, [online], [search on Apr. 27, 2020], the Internet <URL:https://jpn.nec.com/techrep/journal/g19/n01/190118.html>.

* cited by examiner

FIG. 2

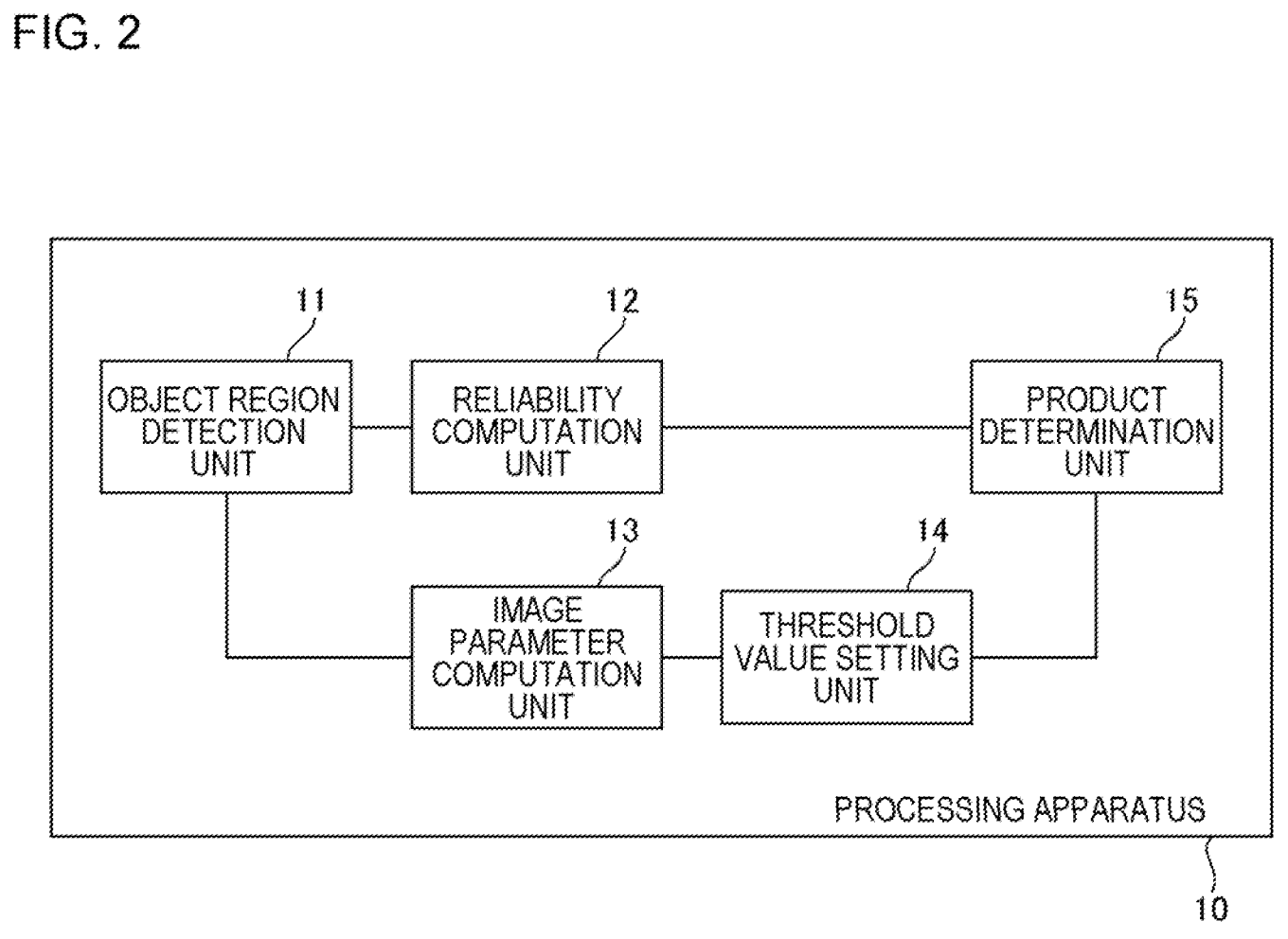

PROCESSING APPARATUS
10
OBJECT REGION DETECTION UNIT
11
RELIABILITY COMPUTATION UNIT
12
IMAGE PARAMETER COMPUTATION UNIT
13
THRESHOLD VALUE SETTING UNIT
14
PRODUCT DETERMINATION UNIT
15

FIG. 7

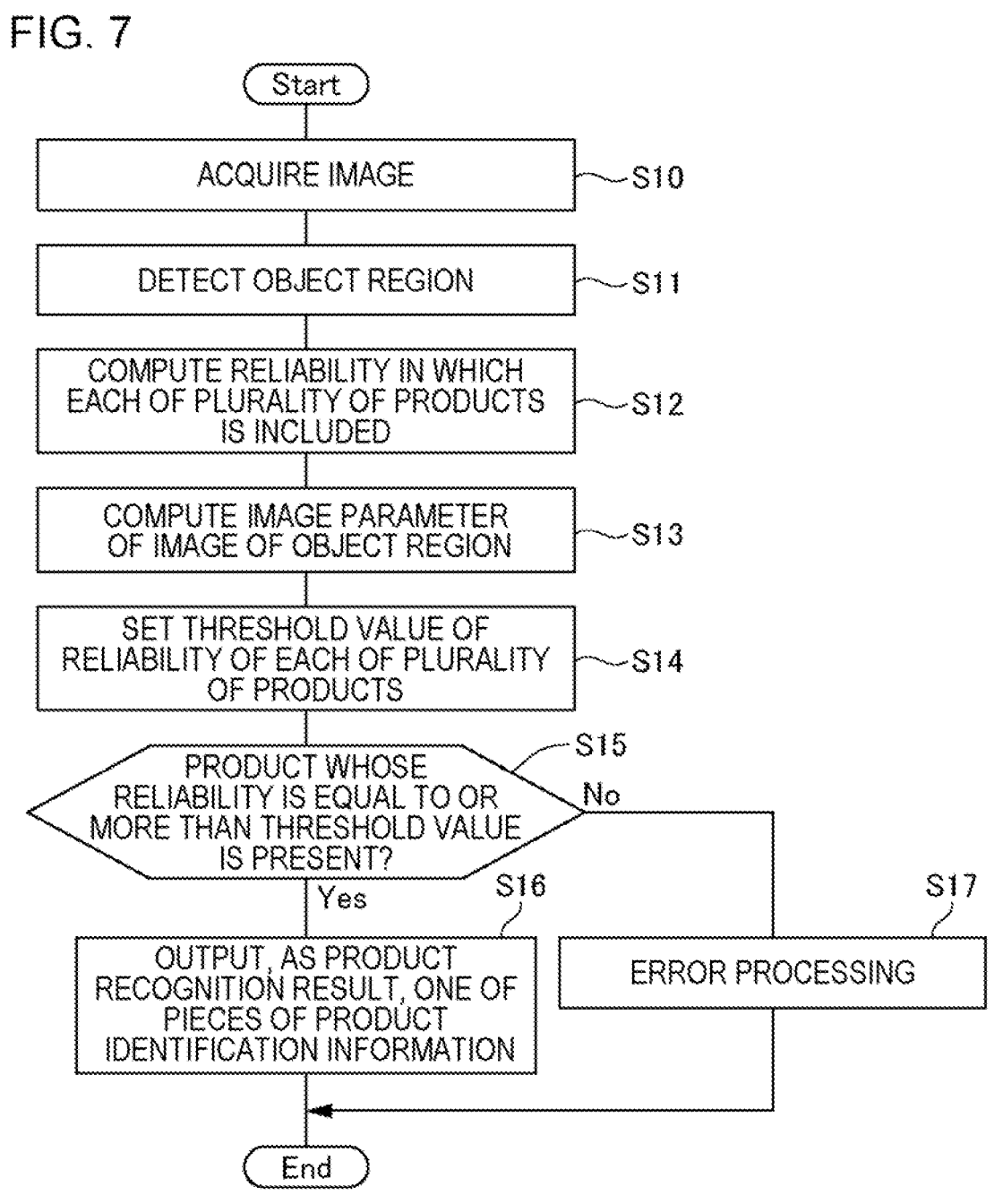

Start
ACQUIRE IMAGE S10
DETECT OBJECT REGION S11
COMPUTE RELIABILITY IN WHICH EACH OF PLURALITY OF PRODUCTS IS INCLUDED S12
COMPUTE IMAGE PARAMETER OF IMAGE OF OBJECT REGION S13
SET THRESHOLD VALUE OF RELIABILITY OF EACH OF PLURALITY OF PRODUCTS S14
PRODUCT WHOSE RELIABILITY IS EQUAL TO OR MORE THAN THRESHOLD VALUE IS PRESENT? S15
Yes
OUTPUT, AS PRODUCT RECOGNITION RESULT, ONE OF PIECES OF PRODUCT IDENTIFICATION INFORMATION S16
No
ERROR PROCESSING S17
End

Figure 10:
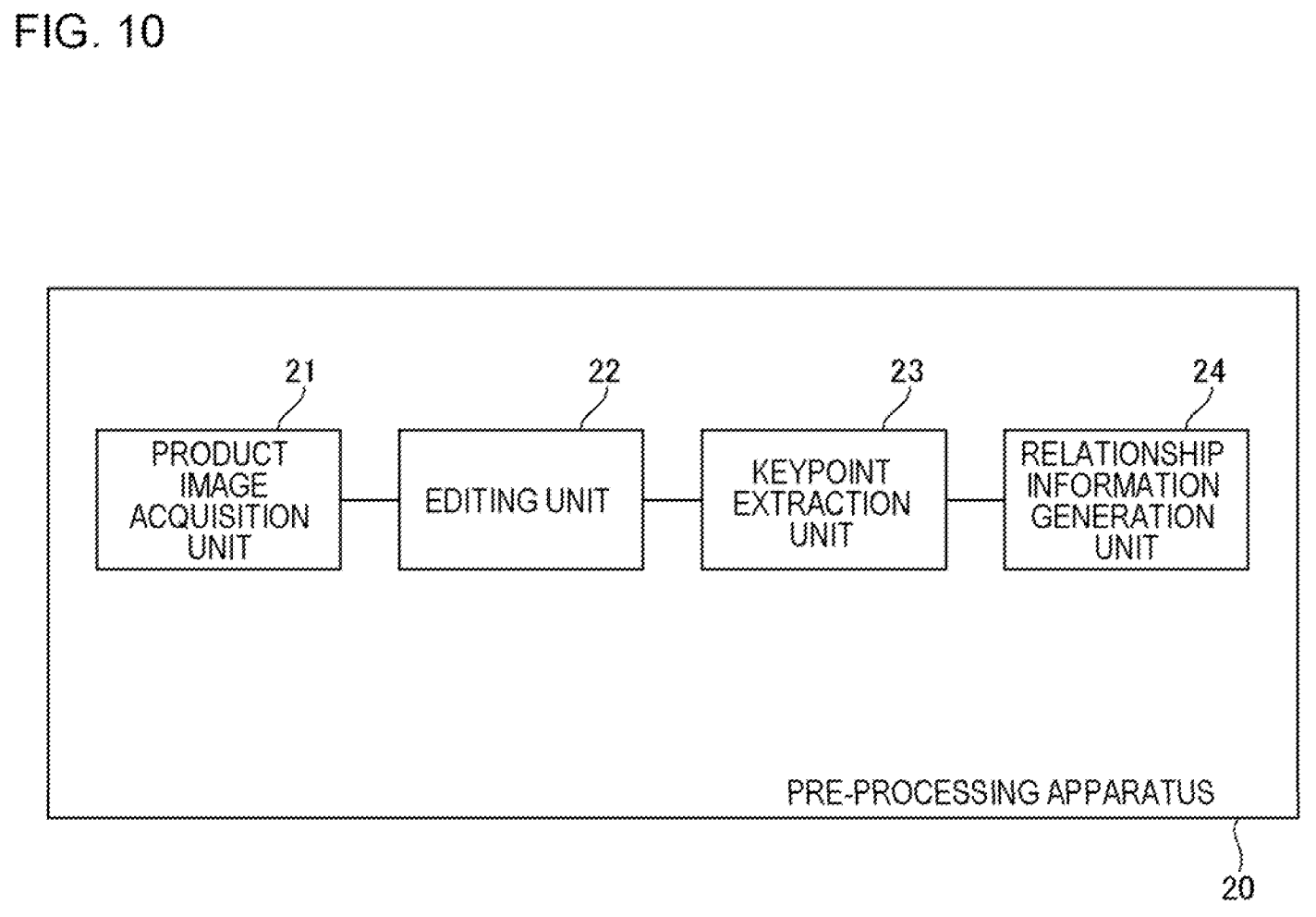

PRE-PROCESSING APPARATUS

21 PRODUCT IMAGE ACQUISITION UNIT

22 EDITING UNIT

23 KEYPOINT EXTRACTION UNIT

24 RELATIONSHIP INFORMATION GENERATION UNIT

PROCESSING APPARATUS, PROCESSING METHOD, AND NON-TRANSITORY STORAGE MEDIUM FOR DETERMINING AN OBJECT BASED ON COLLATED KEYPOINTS AND THRESHOLD VALUE

This application is a National Stage Entry of PCT/JP2020/021379 filed on May 29, 2020, the contents of all of which are incorporated herein by reference, in their entirety.

TECHNICAL FIELD

The present invention relates to a processing apparatus, a pre-processing apparatus, a processing method, and a program.

BACKGROUND ART

Non-Patent Documents 1 and 2 disclose a store system in which settlement processing (such as product registration and payment) at a cash register counter is eliminated. In the technique, a product picked up by a customer is recognized based on an image generated by a camera for photographing inside a store, and settlement processing is automatically performed based on a recognition result at a timing when the customer goes out of the store.

Non-Patent Document 3 discloses a technique of extracting a plurality of keypoints such as a corner point within a package pattern of a product by analyzing an image, performing matching regarding how much degree the extracted keypoint is located at the same position as a keypoint of each of a plurality of products registered in advance in a database, and recognizing a product included in the image, based on the number of matched keypoints. Further, Non-Patent Document 3 discloses a technique of recognizing a plurality of products placed on a table all at once by image recognition.

Patent Document 1 discloses a technique of, in object recognition processing, thinning out a keypoint that does not greatly affect object recognition, and reducing an amount of computation. Patent Document 2 discloses a technique of providing a reading window in an accounting counter and a camera that photographs a product through the reading window, allowing an operator to photograph a product when locating the product in front of the reading window, and recognizing the product, based on an image.

RELATED DOCUMENT

Patent Document

[Patent Document 1] Japanese Patent Application Publication No. 2011-233060

[Patent Document 2] Japanese Patent Application Publication No. 2018-116371

Non-Patent Document

[Non-Patent Document 1] Takuya MIYATA, "Structure of Amazon Go Supermarket without Cash Register to be Achieved by 'Camera and Microphone'", [online], Dec. 10, 2016, [search on Dec. 6, 2019], the Internet <URL: https//www.huffingtonpost.jp/tak-miyata/amazon-go_b_13521384.html>

[Non-Patent Document 2] "NEC, Opened Cash Registerless Store 'NEC SMART STORE' in Main Office—Utilization of Face Recognition, Settlement Simultaneously when Leaving Store", [online]. Feb. 28, 2020, [search on Mar. 27, 2020], the Internet <URL: https://japan.cnet-.com/article/35150024/>

[Non-Patent Document 3] "Heterogeneous Object Recognition to Identify Retail Products", [online], [search on Apr. 27, 2020], the Internet <URL: https://jpn.nec.com/techrep/journal/g19/n01/190118.html>

DISCLOSURE OF THE INVENTION

Technical Problem

As described in Non-Patent Documents 1 to 3, Patent Documents 1 and 2, and the like, a technique for recognizing a product included in an image has been widely studied and utilized. Further, a technique for further improving accuracy of product recognition based on an image has been desired. An object of the present invention is to improve accuracy of product recognition based on an image by a method that is not disclosed in the above-described prior arts.

Solution to Problem

The present invention provides a processing apparatus including:

an object region detection unit that detects, from an image, an object region being a region including an object;

a reliability computation unit that computes, for each product, reliability in which each of the products is included in an image of the object region;

an image parameter computation unit that computes an image parameter related to an image of the object region;

a threshold value setting unit that sets a threshold value of the reliability, based on the image parameter; and a product determination unit that determines, based on the reliability of each of the products and the threshold value, the product included in an image of the object region.

Further, the present invention provides a pre-processing apparatus including:

a product image acquisition unit that acquires a product image including a product;

an editing unit that edits the product image, and generates a plurality of edited images in which at least one of a size and a luminance of an image of a product region being a region including the product are different from each other;

a keypoint extraction unit that performs processing of extracting a keypoint of the product with respect to each of a plurality of the edited images; and a relationship information generation unit that generates, based on a result of the extraction, relationship information indicating a relationship between an image parameter and a number of keypoints to be extracted.

Further, the present invention provides a processing method including, by a computer:

detecting, from an image, an object region being a region including an object;

computing, for each product, reliability in which each of the products is included in an image of the object region;

computing an image parameter related to an image of the object region;

setting a threshold value of the reliability, based on the image parameter; and determining, based on the reliability of each of the products and the threshold value, the product included in an image of the object region.

Further, the present invention provides a program causing a computer to function as the processing apparatus.

Advantageous Effects of Invention

The present invention improves accuracy of product recognition based on an image.

BRIEF DESCRIPTION OF THE DRAWINGS

FIG. 2 is one example of a functional block diagram of the processing apparatus according to the present example embodiment.

FIG. 7 is a flowchart illustrating one example of a flow of processing of the processing apparatus according to the present example embodiment.

FIG. 8 is a flowchart illustrating one example of a flow of processing of the processing apparatus according to the present example embodiment.

FIG. 10 is one example of a functional block diagram of a pre-processing apparatus according to the present example embodiment.

DESCRIPTION OF EMBODIMENTS

First Example Embodiment

Overview

Figure 1:
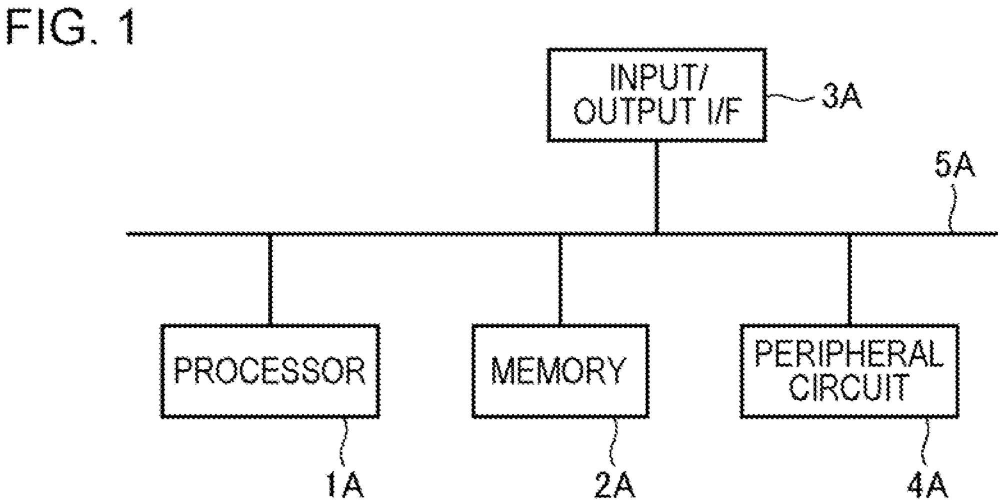
FIG. 1 is a diagram illustrating one example of a hardware configuration of a processing apparatus according to the present example embodiment.

A processing apparatus according to a present example embodiment recognizes a product included in an image by the following processing.

An object region being a region including an object is detected from an image of a processing target.

A keypoint of an object extracted from the image of the object region is collated with a keypoint of each of a plurality of products registered in advance, and reliability in which each of the plurality of products is included in the image is computed based on the number of matched keypoints. The reliability increases, as the number of matched keypoints increases.

One of the products whose reliability is equal to or more than a threshold value is recognized as a product included in the image.

Further, the processing apparatus has a feature that a threshold value of the above-described reliability (hereinafter, may be simply referred to as "a threshold value of reliability") is set for each product, and, based on a size of an image of an object region, for each image.

By setting a threshold value of reliability high, it is possible to suppress an inconvenience that an erroneous recognition result is output. However, when a threshold value of reliability is set too high, an inconvenience that reliability does not exceed the threshold value in any product, and a product included in an image cannot be recognized is likely to occur. In particular, in a case where the number of keypoints extractable from an image decreases, as in a case where a size of an image of an object region is small, or in a case where a product whose real size is small is included in an image, naturally, the number of matched keypoints also decreases, and reliability is lowered. As described above, in a case where the number of keypoints extractable from an image decreases when a threshold value of reliability is set too high, a situation that reliability does not exceed a threshold value in any product (a product cannot be recognized) is likely to occur.

Note that, by setting a threshold value of reliability low, it is possible to suppress an occurrence of a situation that reliability does not exceed a threshold value in any product. However, in this case, an inconvenience that an erroneous recognition result is output is likely to occur.

According to the processing apparatus in which a threshold value of reliability is set for each product, and, based on a size of an image of an object region, for each image, it is possible to set a threshold value of appropriate reliability according to the number (rough indication) of keypoints extractable from an image. Therefore, according to the processing apparatus, it is possible to suppress "an inconvenience that a product cannot be recognized because a threshold value of reliability is not appropriate (reliability does not exceed a threshold value in any product)", while suppressing "an inconvenience that an erroneous recognition result is output".

"Hardware Configuration"

Next, one example of a hardware configuration of the processing apparatus is described. Each functional unit of the processing apparatus is achieved by any combination of hardware and software mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. Further, it is understood by a person skilled in the art that there are various modification examples as a method and an apparatus for achieving the configuration.

FIG. 1 is a block diagram illustrating a hardware configuration of the processing apparatus. As illustrated in FIG. 1, the processing apparatus includes a processor 1A, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be constituted of a plurality of apparatuses that are physically and/or logically separated, or may be constituted of one apparatus that is physically and/or logically integrated. In a case where the processing apparatus is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue a command to each module, and perform an arithmetic operation, based on these arithmetic operation results.

"Functional Configuration"

FIG. 2 illustrates one example of a functional block diagram of a processing apparatus 10. As illustrated in FIG. 2, the processing apparatus 10 includes an object region detection unit 11, a reliability computation unit 12, an image parameter computation unit 13, a threshold value setting unit 14, and a product determination unit 15.

The object region detection unit 11 acquires an image including a product being a recognition target. An image to be acquired by the object region detection unit 11 may be an image photographed for any purpose. For example, the image may be an image photographed for recognizing a product picked up by a customer, may be an image photographed for recognizing a product being an accounting target, or may be an image photographed for another purpose.

Herein, an image photographed for recognizing a product picked up by a customer is described. In this case, one or a plurality of cameras are installed in a store at a position and in an orientation in which a product picked up by a customer can be photographed. For example, a camera may be installed at a position and in an orientation in which a product taken out of each product display shelf is photographed, for each product display shelf. A camera may be installed on a product display shelf, may be installed on a ceiling, may be installed on a floor, may be installed on a wall surface, or may be installed at another location. Note that, an example in which a camera is installed for each product display shelf is merely one example, and the present example embodiment is not limited thereto.

A camera may photograph a moving image constantly (e.g., during business hours), may continuously photograph a still image at a time interval larger than a frame interval of a moving image, or these photographing operations may be performed only during a time when a person present at a predetermined position (such as in front of a product display shelf) is detected by a human sensor or the like.

Figure 3:
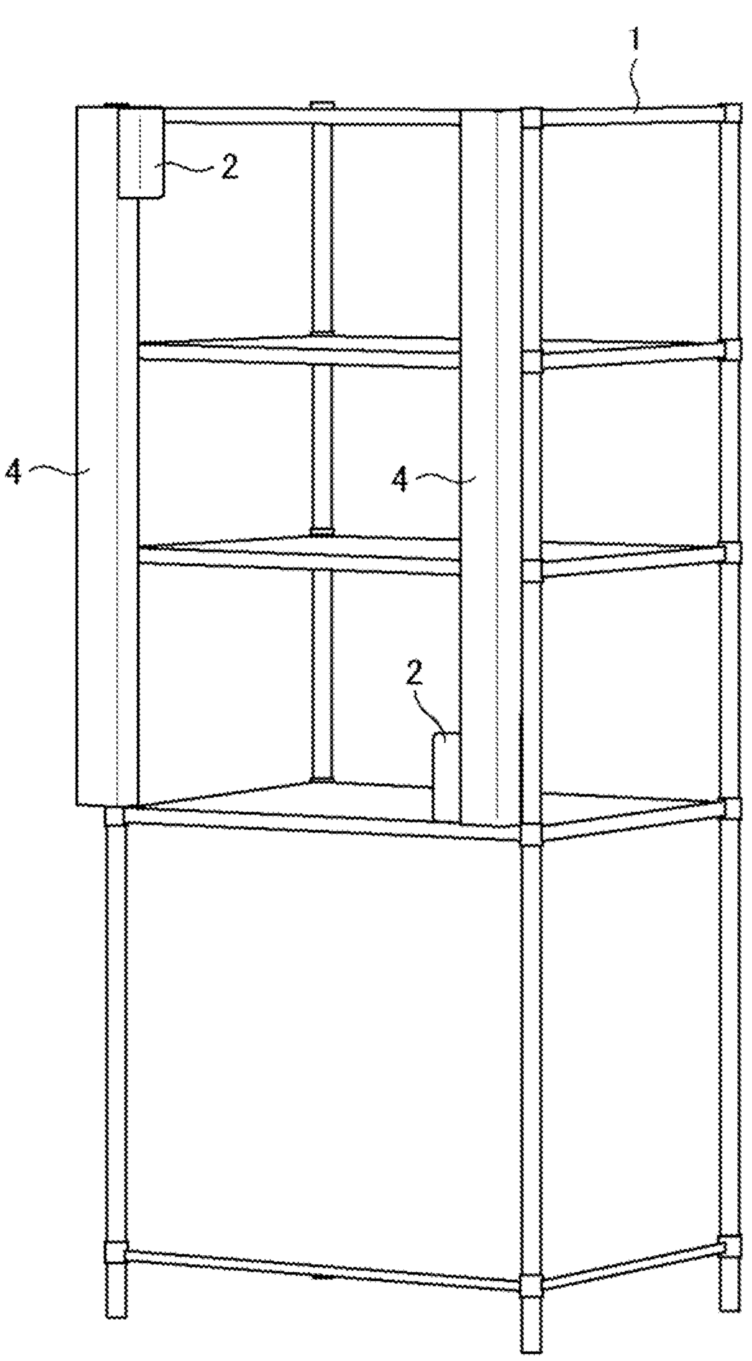
FIG. 3 is a diagram illustrating an installation example of a camera according to the present example embodiment.
Figure 4:
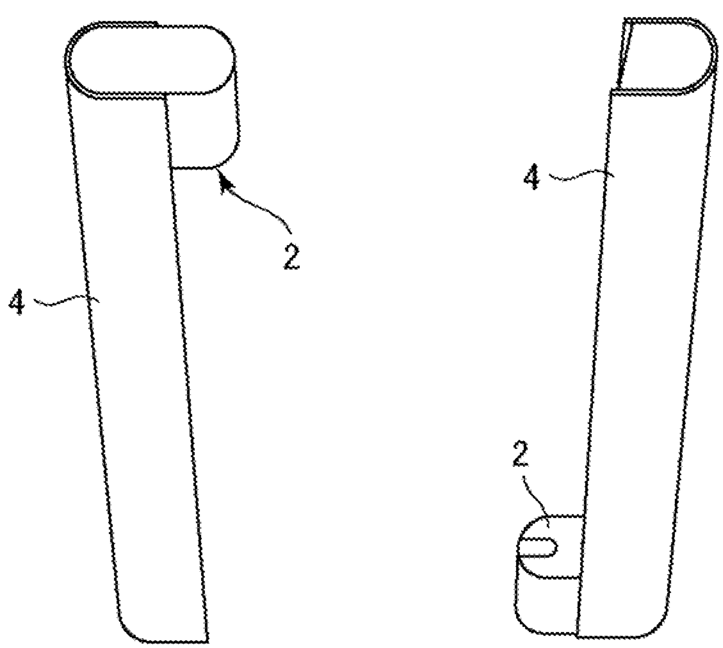
FIG. 4 is a diagram illustrating an installation example of the camera according to the present example embodiment.

Herein, one example of camera installation is described. Note that, a camera installation example described herein is merely one example, and the present example embodiment is not limited thereto. In an example illustrated in FIG. 3, two cameras 2 are installed for each product display shelf 1. FIG. 4 is a diagram in which a frame 4 in FIG. 3 is extracted. A camera 2 and an illumination (not illustrated) are provided for each of two components constituting the frame 4.

A light irradiation surface of the illumination extends in one direction, and the illumination includes a light emitting unit, and a cover for covering the light emitting unit. The illumination mainly irradiates light in a direction orthogonal to an extending direction of the light irradiation surface. The light emitting unit includes a light emitting element such as a LED, and irradiates light in a direction in which the illumination is not covered by the cover. Note that, in a case where the light emitting element is a LED, a plurality of LEDs are aligned in a direction (up-down direction in the figure) in which the illumination extends.

Further, the camera 2 is provided at one end side of a component of the linearly extending frame 4, and has a photographing range in a direction in which light of the illumination is irradiated. For example, in a component of the left-side frame 4 in FIG. 4, the camera 2 has a photographing range in a range extending downward and a range extending obliquely right downward. Further, in a component of the right-side frame 4 in FIG. 4, the camera 2 has a photographing range in a range extending upward and a range extending obliquely left upward.

As illustrated in FIG. 3, the frame 4 is mounted on a front surface frame (or a front surface of a side wall on both sides) of the product display shelf 1 constituting a product placement space. One of components of the frame 4 is mounted on one of the front surface frames in an orientation in which the camera 2 is located at a lower position, and the other of the components of the frame 4 is mounted on the other of the front surface frames in an orientation in which the camera 2 is located at an upper position. Further, the camera 2 mounted on one of the components of the frame 4 photographs an upper range and an obliquely upper range in such a way that an opening portion of the product display shelf 1 is included in a photographing range. On the other hand, the camera 2 mounted on the other of the components of the frame 4 photographs a lower range and an obliquely lower range in such a way that the opening portion of the product display shelf 1 is included in a photographing range. This configuration allows 5 the two cameras 2 to photograph an entire range of the opening portion of the product display shelf 1. Consequently, it becomes possible to photograph, by the two cameras 2, a product taken out of the product display shelf 1 (product picked up by a customer).

In the example, an image generated by a camera may be input to the processing apparatus 10 by real-time processing, or may be input to the processing apparatus 10 by batch processing. Which processing is used can be determined, for example, according to a usage content of a recognition result.

Next, an image photographed for recognizing a product being an accounting target is described. In this case, a camera is installed in an accounting apparatus, and the camera generates the image. As disclosed, for example, in Non-Patent Document 3, a camera may be configured in such a way as to photograph one or a plurality of products placed on a table all at once. In addition to the above, as disclosed, for example, in Patent Document 2, a camera may be configured in such a way as to photograph products one by one according to an operator's operation (operation of locating a product in front of a camera).

In response to acquisition of an image, the object region detection unit 11 detects, from the image, an object region being a region including an object. The object region detection unit 11 detects, from one image, one or a plurality of object regions. The object region detection unit 11 can adopt any available object detection technique. The object region detection unit 11 may detect, as an object region, a region (e.g., a rectangular region) including an object and its periphery. In addition to the above, the object region detection unit 11 may detect, as an object region, a region of a shape along a contour of an object where only the object is present. The latter configuration can be achieved, for example, by utilizing a method of detecting a pixel region where a detection target is present, which is called a semantic segmentation or an instance segmentation.

The reliability computation unit 12 computes, for each product, reliability in which each of the products is included in an image of an object region. Specifically, the reliability computation unit 12 counts the number of matched keypoints for each product by collating between a keypoint of an object extracted from an image of an object region, and a keypoint of each of a plurality of products registered in advance. Further, the reliability computation unit 12 computes reliability, based on the number of matched keypoints. As the number of matched keypoints increases, the reliability increases. Details on an algorithm of processing of extraction of a keypoint, collation of a keypoint, and computing reliability from the number of matched keypoints are not specifically limited.

Hereinafter, reliability in which each product is included in an image of an object region may be referred to as "reliability of each product".

The image parameter computation unit 13 computes an image parameter related to an image of an object region. The image parameter according to the present example embodiment is a size of an image of an object region. The size of an image of an object region may be indicated by an area of a region, may be indicated by a size of an outer periphery of a region, or may be indicated by another method. The area or the size of an outer periphery of a region may be indicated by the number of pixels, or another method may be adopted.

The threshold value setting unit 14 sets, based on an image parameter, a threshold value of reliability for each product, and for each image of an object region. In a case where a plurality of object regions are detected from one image, the threshold value setting unit 14 sets a threshold value of reliability for each image of an object region. The threshold value setting unit 14 sets a smaller threshold value, as a size of an image of an object region decreases, and sets a larger threshold value, as a size of an image of an object region increases. Further, the threshold value setting unit 14 sets a smaller threshold value, as a real size of a product decreases, and sets a larger threshold value, as a real size of a product increases.

Herein, a specific example of processing of setting a threshold value of reliability is described. For example, relationship information indicating a relationship between a size of an image of an object region, and the number (rough indication) of keypoints to be extracted from the image of the size is generated in advance for each product. Further, the threshold value setting unit 14 derives "the number (rough indication) of keypoints to be extracted from the image of the object region" for each product, based on the size of the image (image parameter) of the object region computed by the image parameter computation unit 13, and the relationship information. Subsequently, the threshold value setting unit 14 sets, based on "the number (rough indication) of keypoints to be extracted from the image of the object region", which is derived for each product, a threshold value of reliability for each product. The threshold value setting unit 14 sets a smaller threshold value, as "the number (rough indication) of keypoints to be extracted from the image of the object region" decreases, and sets a larger threshold value, as "the number (rough indication) of keypoints to be extracted from the image of the object region" increases. Details on an algorithm of processing of computing a threshold value of reliability from "the number (rough indication) of keypoints to be extracted from the image of the object region" are not specifically limited.

Figure 5:
FIG. 5 is a diagram illustrating one example of information to be processed by the processing apparatus according to the present example embodiment.

FIG. 5 illustrates one example of the above-described relationship information. A horizontal axis denotes a size of an image of an object region, and a vertical axis denotes the number (rough indication) of keypoints to be extracted. As illustrated in FIG. 5, as a size of an image of an object region decreases, the number (rough indication) of keypoints to be extracted decreases, and as a size of an image of an object region increases, the number (rough indication) of keypoints to be extracted increases. FIG. 5 illustrates relationship information of one certain product, but relationship information as described above is prepared for each product. Further, as a real size of a product decreases, the number (rough indication) of keypoints to be extracted decreases, and as a real size of a product increases, the number (rough indication) of keypoints to be extracted increases.

Figure 6:
FIG. 6 is a diagram illustrating one example of information to be processed by the processing apparatus according to the present example embodiment.

Note that, "the number (rough indication) of keypoints to be extracted", which is indicated by relationship information, may be sequentially changed, as illustrated in FIG. 5, or may be discretely changed, as illustrated in FIG. 6. Further, although not illustrated, "the number (rough indication) of keypoints to be extracted", which is indicated by relationship information, may include a sequential change and a discrete change in a mixed manner. For example, when a size of an image of an object region lies within a first numerical value range, the number (rough indication) of keypoints to be extracted may be sequentially changed, and when a size of an image of an object region lies within a second numerical value range, the number (rough indication) of keypoints to be extracted may be discretely changed.

Further, as illustrated in FIGS. 5 and 6, "a size of an image of an object region", which is indicated by relationship information, may be sequentially changed, or may be discretely changed. In a case where "a size of an image of an object region", which is indicated by relationship information, is discretely changed, for example, the threshold value setting unit 14 can determine, from among a plurality of values of "a size of an image of an object region", which is indicated by relationship information, a value most approximate to the size of the image of the object region computed by the image parameter computation unit 13, and set a threshold value of reliability, based on "the number (rough indication) of keypoints to be extracted", which is associated with the determined value.

Further, a sequential change of a value may be such that a mode of change is expressed by a linear formula as illustrated in FIGS. 5 and 6, or may be expressed by another method such as a polynomial, an exponential function, and a logarithmic function.

Further, as described above, various methods can be adopted as a way of expressing the number (rough indication) of keypoints to be extracted, but by which method the number is expressed may differ for each product.

Referring back to FIG. 2, the product determination unit 15 determines a product included in an image of a first object region, based on reliability of each product computed based on the image of the first object region, and a threshold value of reliability of each product computed based on the image of the first object region. The product determination unit 15 determines whether reliability of each product is equal to or more than a threshold value of each product, for each product. Further, the product determination unit 15 determines, as a product included in the image of the object region, one of the products whose reliability is equal to or more than the threshold value.

In a case where there are a plurality of products whose reliability is equal to or more than the threshold value, the product determination unit 15 selects one of the plurality of products, and determines the selected product, as a product included in the image of the object region. For example, the product determination unit 15 may select a product whose reliability is highest. In addition to the above, the product determination unit 15 may select a product in which a degree of discrepancy between reliability and a threshold value is largest. The degree of discrepancy between reliability and a threshold value may be indicated by a ratio (=(reliability)/(threshold value)) of reliability with respect to a threshold value, may be indicated by a difference (=(reliability)−(threshold value)) between a threshold value and reliability, or may be indicated by another method.

Next, one example of a flow of processing of the processing apparatus 10 is described by using a flowchart in FIG. 7.

First, in response to acquisition of an image (S10), the object region detection unit 11 detects, from the image, an object region being a region including an object (S11).

Next, the reliability computation unit 12 computes, for each detected object region, reliability in which each of a plurality of products is included in an image of each object region (S12). Subsequently, the image parameter computation unit 13 computes, for each detected object region, an image parameter indicating a size of the image of the object region (S13).

Subsequently, the threshold value setting unit 14 sets, for each detected object region, a threshold value of reliability of each of the plurality of products, based on the size of the image of the object region (S14). The threshold value setting unit 14 sets a smaller threshold value, as a size of an image of an object region decreases, and sets a larger threshold value, as a size of an image of an object region increases. Further, the threshold value setting unit 14 sets a smaller threshold value, as a real size of a product decreases, and sets a larger threshold value, as a real size of a product increases.

Subsequently, the product determination unit 15 determines, for each detected object region, whether reliability of each product is equal to or more than a threshold value of each product.

Further, in a case where there is a product whose reliability is equal to or more than the threshold value (Yes in S15), the product determination unit 15 outputs, as product identification information (a production recognition result) of a product included in the image of the object region, one of pieces of product identification information of products whose reliability is equal to or more than the threshold value (S16). In a case where there is only one product whose reliability is equal to or more than the threshold value, the product determination unit 15 outputs product identification information of the product. On the other hand, in a case where there are a plurality of products where reliability is equal to or more than the threshold value, the product determination unit 15 selects one of the plurality of products, and outputs product identification information of the selected product. A method of the selection is as described above.

On the other hand, in a case where there is no product whose reliability is equal to or more than the threshold value (No in S15), the product determination unit 15 performs error processing (S17). For example, in the error processing, the product determination unit 15 may perform an error notification of notifying an operator of a fact that product recognition cannot be correctly performed in the image of the object region. The error notification can be achieved via any available output apparatus such as a display, a speaker, a warning lamp, and a projection apparatus.

Figure 8:
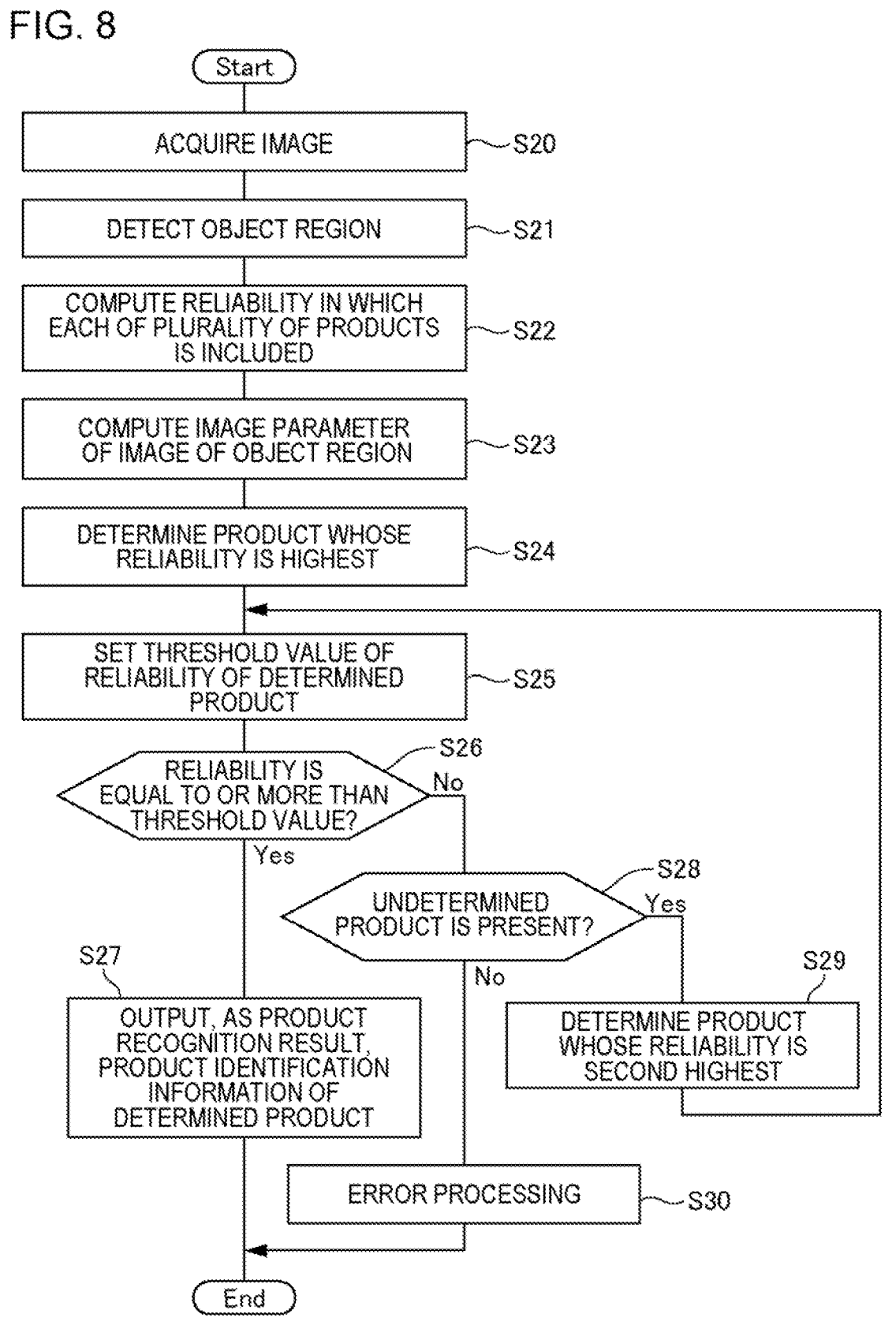

Next, another example of a flow of processing of the processing apparatus 10 is described by using a flowchart in FIG. 8.

First, in response to acquisition of an image (S20), the object region detection unit 11 detects, from the image, an object region being a region including an object (S21).

Next, the reliability computation unit 12 computes, for each detected object region, reliability in which each of a plurality of products is included in an image of each object region (S22). Subsequently, the image parameter computation unit 13 computes, for each detected object region, an image parameter indicating a size of the image of the object region (S23).

Subsequently, the threshold value setting unit 14 determines, for each detected object region, a product whose reliability computed in S22 is highest (S24). Further, the threshold value setting unit 14 sets, for each detected object region, a threshold value of the reliability of the product determined in S24, based on the size of the image of the object region (S25). The threshold value setting unit 14 sets a smaller threshold value, as a size of an image of an object region decreases, and sets a larger threshold value, as a size of an image of an object region increases. Further, the threshold value setting unit 14 sets a smaller threshold value, as a real size of a product decreases, and sets a larger threshold value, as a real size of a product increases.

Subsequently, the product determination unit 15 determines, for each detected object region, whether the reliability computed in S22 of the product determined in S24 is equal to or more than the threshold value set in S25.

Further, in a case where the reliability is equal to or more than the threshold value (Yes in S26), the product determination unit 15 outputs, as product identification information (a product recognition result) of a product included in the image of the object region, product identification information of the product determined in S24 (S27).

On the other hand, in a case where the reliability is not equal to or more than the threshold value (No in S26), when there remains an undetermined product (Yes in S28), the product determination unit 15 determines a product whose reliability is second highest (S29). Then, the processing apparatus 10 returns to S25, and repeats similar processing. Note that, all products may be set as a determination target, or a part of products may be set as a determination target. A part of products serving as a determination target is, for example, a product whose reliability computed in S22 is equal to or more than a lower limit value (value common among all products) being set in advance.

Note that, in a case where there does not remain an undetermined product (No in S28), the product determination unit 15 performs error processing (S30). The error processing is similar to the above-described error processing in S17.

Note that, in the present example embodiment, a processing content thereafter with respect to a product recognition result (product identification information of a recognized product), which is output from the product determination unit 15, is not specifically limited.

For example, the product recognition result may be utilized in accounting processing in a store. Examples of a usage scene include scenes as disclosed in Non-Patent Documents 1 to 3 and Patent Document 2, but the present example embodiment is not limited thereto.

In addition to the above, a product recognition result may be utilized for a preference survey of a customer, a marketing research, and the like. For example, it is possible to analyze a product and the like in which each customer is interested by registering a product picked up by each customer in association with each customer. Recognition of each customer can be achieved by utilizing, for example, a face authentication technique and the like. Further, it is possible to analyze in which product, a customer is interested by registering that the customer has picked up a product for each product. Furthermore, it is possible to analyze an attribute of a customer who is interested in each product by estimating an attribute (such as gender, an age group, and nationality) of a customer by utilizing a conventional image analysis technique, and registering an attribute of a customer who has picked up each product.

Advantageous Effect

As described above, the processing apparatus 10 collates between a keypoint of an object extracted from an image and a keypoint of each of a plurality of products registered in advance, computes reliability in which each of the plurality of products is included in the image, based on the number of matched keypoints, and recognizes, as a product included in the image, one of the products whose reliability is equal to or more than a threshold value. Note that, the reliability increases, as the number of matched keypoints increases.

Further, the processing apparatus can set a threshold value of reliability, for each product, and, based on a size of an image of an object region, for each image.

In this way, according to the processing apparatus 10 that sets a threshold value of reliability, for each product, and, based on a size of an image of an object region, for each image, it is possible to set a threshold value of appropriate reliability according to the number (rough indication) of keypoints extractable from the image.

For example, the processing apparatus 10 can set, in a product in which a real size is small, and the number of keypoints extractable from an image is relatively small, a threshold value of relatively small reliability according to the real size. Further, in a case where an image of an object region is small, and the number of keypoints extractable from the image is relatively small, the processing apparatus 10 can set a threshold value of relatively small reliability according to a size of the image of the object region.

Likewise, the processing apparatus 10 can set, in a product in which a real size is large, and the number is relatively large, a threshold value of relatively large reliability according to the real size. Further, in a case where an object region within an image is large, and the number of keypoints extractable from the image is relatively large, the processing apparatus 10 can set a threshold value of relatively large reliability according to a size of the image of the object region.

In this way, by setting a threshold value of appropriate reliability according to the number (rough indication) of keypoints extractable from an image, it is possible to suppress "an inconvenience that a product cannot be recognized because a threshold value of reliability is not appropriate (reliability does not exceed a threshold value in any product)", while suppressing "an inconvenience that an erroneous recognition result is output".

Modification Example

Next, a modification example is described. The modification example is appliable to all the following example embodiments.

The threshold value setting unit 14 may set, based on an image parameter, a threshold value of reliability common among all products, for each image of an object region. For example, the above-described relationship information (see FIGS. 5 and 6) to be generated in advance may be information common among all products. Further, the threshold value setting unit 14 may set, based on relationship information common among all products, a threshold value of reliability common among all products.

In a case of the modification example, although a threshold value of reliability is not set for each product, since a threshold value of reliability is set for each image of an object region, an advantageous effect similar to that of the above-described processing apparatus 10 according to the present example embodiment is achieved.

As another modification example, the threshold value setting unit 14 may set, based on an image parameter, a threshold value of reliability for each product group, for each image of an object region. For example, the above-described relationship information (see FIGS. 5 and 6) may be generated for each product group. Further, the threshold value setting unit 14 may set, based on relationship information for each product group, a threshold value of reliability for each product group. The product group is a group of products in which at least one of a shape, a size, and a design of a product is similar to each other, and the number of keypoints to be extracted is similar, and, for example, products of a same type, products of a same type and of a same manufacturer, products of a same series, and the like are exemplified.

In a case of the another modification example, an advantageous effect similar to that of the above-described processing apparatus 10 according to the present example embodiment is achieved. Further, as compared with a case where a threshold value of reliability is set for each product, since the number of threshold values of reliability to be set decreases, processing load on a computer can be reduced.

Second Example Embodiment

An image parameter computation unit 13 according to a present example embodiment computes, as an image parameter, a luminance of an image of an object region. The luminance of an image of an object region is a statistical value (such as an average value, a median, a mode, a maximum value, and a minimum value) of a luminance of a plurality of pixels included in an image of an object region.

Further, a threshold value setting unit 14 according to the present example embodiment sets, based on such an image parameter, a threshold value of reliability for each product, and for each image of an object region. In a case where a plurality of object regions are detected from one image, the threshold value setting unit 14 sets a threshold value of reliability for each object region. The threshold value setting unit 14 sets a smaller threshold value, as a luminance of an image of an object region is away from a reference range.

Herein, a specific example of processing of setting a threshold value of reliability is described. For example, relationship information indicating a relationship between a luminance of an image of an object reaction, and the number (rough indication) of keypoints to be extracted from the image in a luminance state as described above is generated in advance for each product. Further, the threshold value setting unit 14 derives, based on the luminance (image parameter) of the image of the object region computed by the image parameter computation unit 13 and the relationship information, "the number (rough indication) of keypoints to be extracted from the image of the object region" for each product. Subsequently, the threshold value setting unit 14 sets, based on "the number (rough indication) of keypoints to be extracted from the image of the object region", which is derived for each product, a threshold value of reliability for each product. The threshold value setting unit 14 sets a smaller threshold value, as "the number (rough indication) of keypoints to be extracted from the image of the object region" decreases, and sets a larger threshold value, as "the number (rough indication) of keypoints to be extracted from the image of the object region" increases. Details on an algorithm of processing of computing a threshold value of reliability from "the number (rough indication) of keypoints to be extracted from the image of the object region" are not specifically limited.

Figure 9:
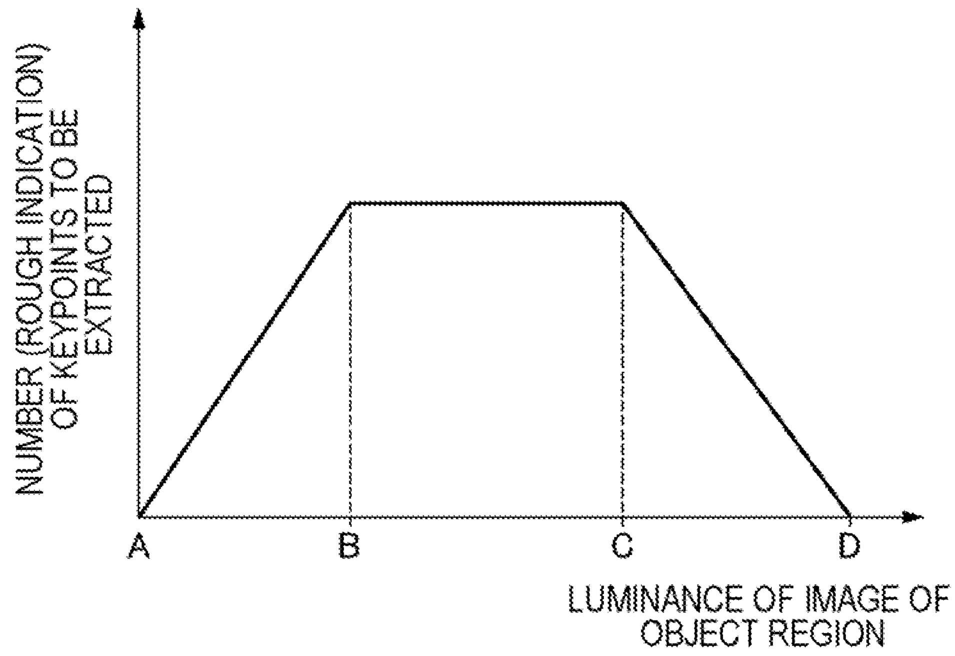
FIG. 9 is a diagram illustrating one example of information to be processed by the processing apparatus according to the present example embodiment.

FIG. 9 illustrates one example of the above-described relationship information. A horizontal axis denotes a luminance of an image of an object region, and a vertical axis denotes the number (rough indication) of keypoints to be extracted. As illustrated in FIG. 9, the number (rough indication) of keypoints to be extracted becomes maximum when a luminance of an image of an object region lies within a reference range (being equal to or more than B and being equal to or less than C), and the number (rough indication) of keypoints to be extracted decreases, as the luminance is away from the reference range. FIG. 9 illustrates relationship information of one certain product, but relationship information as described above is prepared for each product. Further, as a real size of a product decreases, the number (rough indication) of keypoints to be extracted decreases, and as a real size of a product increases, the number (rough indication) of keypoints to be extracted increases.

Note that, in a range (being equal to or more than A and being equal to or less than B, and being equal to or more than C and being equal to or less than D) except for the reference range, "the number (rough indication) of keypoints to be extracted" may be sequentially changed as illustrated in FIG. 9, or may be discretely changed although not illustrated. Further, in the reference range (being equal to or more than B and being equal to or less than C), "the number (rough indication) of keypoints to be extracted" may be constant as illustrated in FIG. 9, and may be sequentially or discretely changed although not illustrated.

Further, "a luminance of an image of an object region", which is indicated by relationship information, may be sequentially changed as illustrated in FIG. 9, or may be discretely changed. In a case where "a luminance of an image of an object region", which is indicated by relationship information, is discretely changed, for example, the threshold value setting unit 14 can determine, from among a plurality of values of "a luminance of an image of an object region", which is indicated by the relationship information, a value most approximate to the luminance of the image of the object region computed by the image parameter computation unit 13, and set a threshold value of reliability, based on "the number (rough indication) of keypoints to be extracted", which is associated with the determined value.

Further, as illustrated in FIG. 9, a sequential change of a value may be such that a mode of change is expressed by a linear formula as illustrated in FIG. 9, or may be expressed by another method such as a polynomial, an exponential function, and a logarithmic function.

Further, as described above, various methods can be adopted as a way of expressing the number (rough indication) of keypoints to be extracted, but by which method the number is expressed may differ for each product.

Other configurations of a processing apparatus 10 are similar to those of the first example embodiment.

In the processing apparatus 10 according to the present example embodiment, an advantageous effect similar to that of the processing apparatus 10 according to the first example embodiment is achieved. Further, in the processing apparatus 10 according to the present example embodiment, it is possible to set a threshold value of appropriate reliability, taking into consideration a difference in the number of keypoints extractable based on a luminance of an image of an object region. Consequently, it is possible to improve accuracy of product recognition by reducing an influence of a difference in the number of keypoints extractable based on a luminance of an image of an object region.

Third Example Embodiment

An image parameter computation unit 13 according to a present example embodiment computes, as image parameters, a size and a luminance of an image of an object region.

Further, a threshold value setting unit 14 according to the present example embodiment sets, based on such two image parameters, a threshold value of reliability for each product, and for each image of an object region. In a case where a plurality of object regions are detected from one image, the threshold value setting unit 14 sets a threshold value of reliability for each object region.

The threshold value setting unit 14 sets a smaller threshold value, as a size of an image of an object region decreases, and sets a larger threshold value, as a size of an image of an object region increases. Further, the threshold value setting unit 14 sets a smaller threshold value, as a luminance of an image of an object region is away from a reference range. Further, the threshold value setting unit 14 sets a smaller threshold value, as a real size of a product decreases, and sets a larger threshold value, as a real size of a product increases.

Herein, a specific example of processing of setting a threshold value of reliability is described. For example, relationship information indicating a relationship among a size of an image of an object region, a luminance of the image of the object reaction, and the number (rough indication) of keypoints to be extracted from the image having the size and a luminance state as described above is generated in advance for each product. Further, the threshold value setting unit 14 derives, based on the size and the luminance (image parameters) of the image of the object region computed by the image parameter computation unit 13 and the relationship information, "the number (rough indication) of keypoints to be extracted from the image of the object region" for each product. Subsequently, the threshold value setting unit 14 sets, based on "the number (rough indication) of keypoints to be extracted from the image of the object region", which is derived for each product, a threshold value of reliability for each product. The threshold value setting unit 14 sets a smaller threshold value, as "the number (rough indication) of keypoints to be extracted from the image of the object region" decreases, and sets a larger threshold value, as "the number (rough indication) of keypoints to be extracted from the image of the object region" increases. Details on an algorithm of processing of computing a threshold value of reliability from "the number (rough indication) of keypoints to be extracted from the image of the object region" are not specifically limited.

Other configurations of a processing apparatus 10 are similar to those of the first and second example embodiments.

In the processing apparatus 10 according to the present example embodiment, an advantageous effect similar to that of the processing apparatus 10 according to the first and second example embodiments is achieved. Further, in the processing apparatus 10 according to the present example embodiment, it is possible to set a threshold value of appropriate reliability, taking into consideration a difference in the number of keypoints extractable based on a size and a luminance of an image of an object region. Consequently, it is possible to improve accuracy of product recognition by reducing an influence of a difference in the number of keypoints extractable based on a size and a luminance of an image of an object region.

Fourth Example Embodiment

A pre-processing apparatus 20 according to a present example embodiment has a function of generating relationship information to be used by a processing apparatus 10.

One example of a hardware configuration of the pre-processing apparatus 20 is similar to one example of a hardware configuration of the processing apparatus 10.

FIG. 10 illustrates one example of a functional block diagram of the pre-processing apparatus 20. As illustrated in FIG. 10, the pre-processing apparatus 20 includes a product image acquisition unit 21, an editing unit 22, a keypoint extraction unit 23, and a relationship information generation unit 24.

Figure 11:
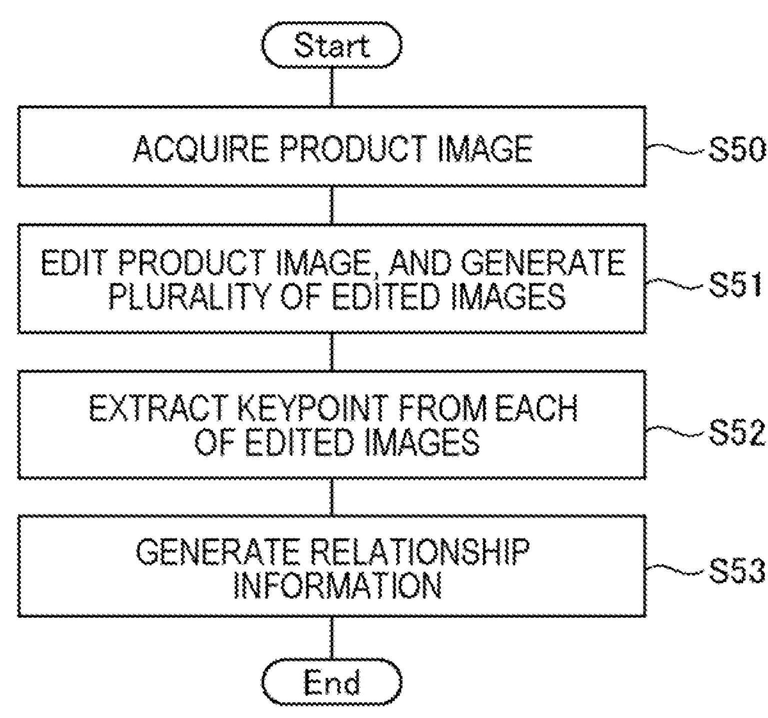
FIG. 11 is a flowchart illustrating one example of a flow of processing of the pre-processing apparatus according to the present example embodiment.

A flowchart in FIG. 11 illustrates one example of a flow of processing of the pre-processing apparatus 20.

First, the product image acquisition unit 21 acquires a product image including a product (S50).

Next, the editing unit 22 edits the product image, and generates a plurality of edited images in which at least one of a size and a luminance of an image of a product region being a region including the product is different from each other (S51). Specifically, the editing unit 22 generates a plurality of edited images from one product image. Further, in the plurality of edited images, at least one of a size and a luminance of an image of a product region is different from each other.

Subsequently, the keypoint extraction unit 23 performs processing of extracting a keypoint of the product with respect to each of the plurality of edited images (S52). Details on an algorithm of processing of extracting a keypoint are not specifically limited.

Subsequently, the relationship information generation unit 24 generates, based on a result of the extraction in S52, relationship information indicating a relationship between an image parameter, and the number of keypoints to be extracted from the image (S53). The image parameter is at least one of a size and a luminance of an image of a product region. The size and the luminance of an image of a product region are as described in the first to third example embodiments.

The relationship information to be generated by the relationship information generation unit 24 may be information (such as a table) in which a value of an image parameter acquired by pieces of processing in S50 to S52, and the number of keypoints to be extracted are associated with each other. In this case, the value of the image parameter and the value of the number of keypoints to be extracted, which are indicated by relationship information, become discrete.

In addition to the above, the relationship information generation unit 24 may derive an approximation formula on an acquired data group by utilizing any method such as a straight line approximation, a polynomial approximation, an exponential approximation, and a logarithmic approximation. In this case, a value of an image parameter and a value of the number of keypoints to be extracted, which are indicated by relationship information, become sequential.

In addition to the above, the relationship information generation unit 24 may output, toward an operator, information in which a value of an image parameter acquired by pieces of processing in S50 to S52, and the number of keypoints to be extracted are associated with each other. Further, the relationship information generation unit 24 may generate relationship information, based on these pieces of information, and an input of an operator.

Note that, by performing the above-described processing for each product, the pre-processing apparatus 20 can generate relationship information for each product. Further, the pre-processing apparatus 20 can generate, based on relationship information for each product, relationship information for each product group described in the modification example of the first example embodiment, relationship information common among all products, and the like.

In the above-described pre-processing apparatus 20 according to the present example embodiment, it is possible to generate relationship information to be processed by the processing apparatus 10 described in the first to third example embodiments. Further, the pre-processing apparatus 20 generates a plurality of edited images in which at least one of a size and a luminance of an image of a product region is different from each other by editing one product image, and generates, based on the plurality of edited images, relationship information indicating a relationship between an image parameter and the number of keypoints to be extracted. Therefore, labor of an operator preparing an image can be reduced.

Note that, in the present description, "acquisition" includes at least one of "acquisition of data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "input of data to be output from another apparatus to an own apparatus (passive acquisition)", based on a user input, or based on a command of a program, for example, receiving data to be distributed (or transmitted, push-notified, or the like), and acquiring by selecting from received data or information, and "generating new data by editing data (such as converting into a text, rearranging data, extracting a part of pieces of data, and changing a file format) and the like, and acquiring the new data".

While the invention of the present application has been described with reference to the example embodiments (and examples), the invention of the present application is not limited to the above-described example embodiments (and examples). A configuration and details of the invention of the present application can be modified in various ways comprehensible to a person skilled in the art within the scope of the invention of the present application.

A part or all of the above-described example embodiments may also be described as the following supplementary notes, but is not limited to the following.

1. A processing apparatus including:

an object region detection unit that detects, from an image, an object region being a region including an object;

a reliability computation unit that computes, for each product, reliability in which each of the products is included in an image of the object region;

an image parameter computation unit that computes an image parameter related to an image of the object region;

a threshold value setting unit that sets a threshold value of the reliability, based on the image parameter; and a product determination unit that determines, based on the reliability of each of the products and the threshold value, the product included in an image of the object region.

2. The processing apparatus according to supplementary note 1, wherein the image parameter indicates a size of an image of the object region, and the threshold value setting unit sets the smaller threshold value, as a size of an image of the object region decreases.

3. The processing apparatus according to supplementary note 1, wherein the threshold value setting unit sets the threshold value, based on relationship information indicating a relationship between a size of an image of the object region, and a number of keypoints to be extracted.

4. The processing apparatus according to any one of supplementary notes 1 to 3, wherein the image parameter indicates a luminance of an image of the object region, and the threshold value setting unit sets the smaller threshold value, as a luminance of an image of the object region is away from a reference range.

5. The processing apparatus according to supplementary note 4, wherein the threshold value setting unit sets the threshold value, based on relationship information indicating a relationship between a luminance of an image of the object region, and a number of keypoints to be extracted.

6. The processing apparatus according to supplementary note 3 or 5, wherein the threshold value setting unit sets the smaller threshold value, as a number of keypoints to be extracted decreases.

7. The processing apparatus according to any one of supplementary notes 1 to 6, wherein the threshold value setting unit sets the threshold value for the each product, and the product determination unit determines the product included in an image of the object region, based on the reliability of each of the products, and the threshold value of each of the products.

8. The processing apparatus according to supplementary note 7, wherein the threshold value determination unit sets the smaller threshold value, as a real size of the product decreases.

9. The processing apparatus according to supplementary note 7 or 8, wherein the threshold value setting unit sets the threshold value, based on relationship information indicating, for the each product, a relationship between a size of an image of the object region and a number of keypoints to be extracted, or a relationship between a luminance of an image of the object region and a number of keypoints to be extracted.

10. The processing apparatus according to any one of supplementary notes 1 to 9, wherein the product determination unit determines, as the product included in an image of the object region, one of the products whose reliability is equal to or more than the threshold value.

11. A pre-processing apparatus including:

a product image acquisition unit that acquires a product image including a product;

an editing unit that edits the product image, and generates a plurality of edited images in which at least one of a size and a luminance of an image of a product region being a region including the product are different from each other;

a keypoint extraction unit that performs processing of extracting a keypoint of the product with respect to each of a plurality of the edited images; and a relationship information generation unit that generates, based on a result of the extraction, relationship information indicating a relationship between an image parameter and a number of keypoints to be extracted.

12. A processing method including, by a computer:

detecting, from an image, an object region being a region including an object;

computing, for each product, reliability in which each of the products is included in an image of the object region;

computing an image parameter related to an image of the object region;

setting a threshold value of the reliability, based on the image parameter; and determining, based on the reliability of each of the products and the threshold value, the product included in an image of the object region.

13. A program causing a computer to function as the processing apparatus according to any one of supplementary notes 1 to 10.

What is claimed is:

1. A processing apparatus comprising:

at least one memory configured to store one or more instructions; and at least one processor configured to execute the one or more instructions to:

detect, from an image, an object region being a region including an object;

collate first keypoints, of the object and extracted from the object region, with second keypoints of each of a plurality of products registered in advance;

compute reliabilities of ones of the plurality of products being included in the object region and based on a number of matched keypoints of the first keypoints and the second keypoints, the reliabilities being higher as the number of matched keypoints is larger;

compute a luminance of the object region;

determine, based on the luminance of the object region and relationship information indicating a relationship between the luminance of the object region and a number of keypoints to be extracted from the object region, an expected number of keypoints to be extracted;

set, based on the expected number of keypoints, a threshold value of the reliabilities, the threshold value being higher as the expected number of keypoints is larger;

compare the reliabilities of the ones of the plurality of products with the threshold value;

recognize, as included in the object region, a product, of the plurality of products, whose reliability, of the reliabilities, is determined to be equal to or greater than the threshold value as included in the object region;

set the threshold value for each product; and determine the product included in the image of the object region, based on the reliabilities and the threshold value of each of the products.

2. The processing apparatus according to claim 1, wherein an image parameter indicates a size of the image of the object region, and the at least one processor is further configured to execute the one or more instructions to set a smaller threshold value, as the size of the image of the object region decreases, and the smaller threshold value is smaller than the threshold value.

3. The processing apparatus according to claim 1, wherein an image parameter indicates the luminance of the object region, and the at least one processor is further configured to execute the one or more instructions to set a smaller threshold value, as the luminance of the object region is away from a reference range, and the smaller threshold value is smaller than the threshold value.

4. The processing apparatus according to claim 1, wherein the at least one processor is further configured to execute the one or more instructions to set a smaller threshold value, as the number of keypoints to be extracted decreases, and the smaller threshold value is smaller than the threshold value.

5. The processing apparatus according to claim 1, wherein the at least one processor is further configured to execute the one or more instructions to set a smaller threshold value, as a real size of the product decreases, and the smaller threshold value is smaller than the threshold value.

6. A non-transitory storage medium storing a program causing a computer to function as the processing apparatus according to claim 1.

7. A processing method comprising, by a computer:

detecting, from an image, an object region being a region including an object;

collating first keypoints, of the object and extracted from the object region, with second keypoints of each of a plurality of products registered in advance;

computing reliabilities of ones of the plurality of products being included in the object region and based on a number of matched keypoints of the first keypoints and the second keypoints, the reliabilities being higher as the number of matched keypoints is larger;

computing a luminance of the object region;

determining, based on the luminance of the object region and relationship information indicating a relationship between the luminance of the object region and a number of keypoints to be extracted from the object region, an expected number of keypoints to be extracted;

setting, based on the expected number of keypoints, a threshold value of the reliabilities, the threshold value being higher as the expected number of keypoints is larger;

comparing the reliabilities of the ones of the plurality of products with the threshold value;

recognizing, as included in the object region, a product, of the plurality of products, whose reliability, of the reliabilities, is determined to be equal to or greater than the threshold value as included in the object region;

setting the threshold value for each product, and determining the product included in the image of the object region, based on the reliabilities and the threshold value of each of the products.

* * * * *